S. J. BROWN.
FISH BAIT OR LURE.
APPLICATION FILED SEPT. 20, 1919.
1,365,813.	Patented Jan. 18, 1921.
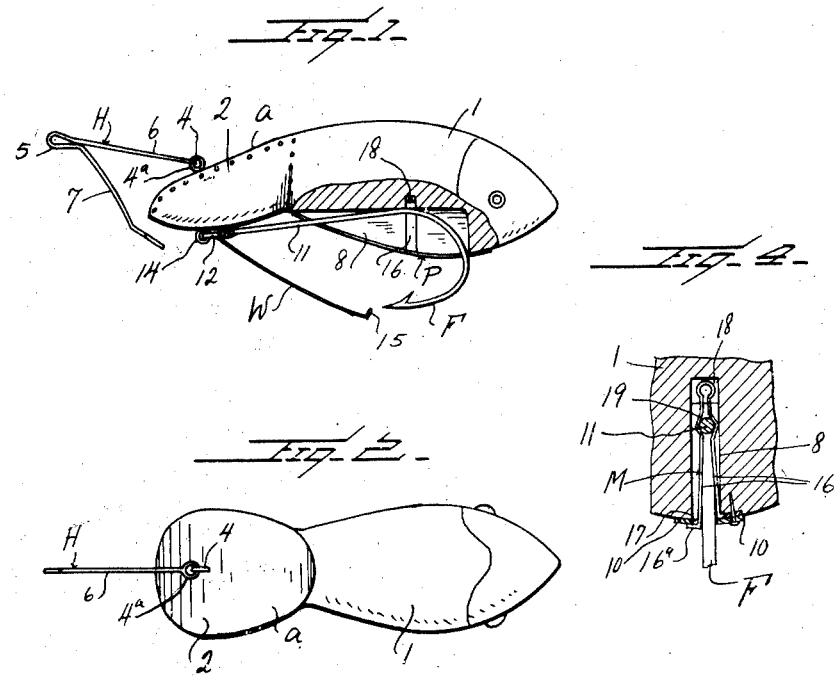
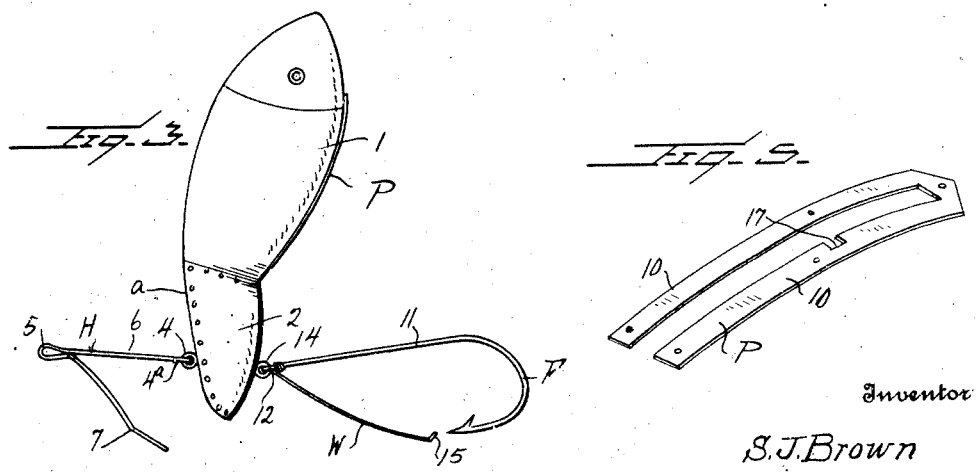
Inventor
S. J. Brown
By Watson E. Coleman
Attorney

UNITED STATES PATENT OFFICE.

SAMUEL J. BROWN, OF OSAKIS, MINNESOTA.

FISH BAIT OR LURE.

1,365,813.  Specification of Letters Patent.  Patented Jan. 18, 1921.

Application filed September 20, 1919. Serial No. 325,185.

*To all whom it may concern:*

Be it known that I, SAMUEL J. BROWN, a citizen of the United States, residing at Osakis, in the county of Douglas and State of Minnesota, have invented certain new and useful Improvements in Fish Bait or Lures, of which the following is a specification, reference being had to the accompanying drawings.

This invention relates to certain improvements in fish bait or lures, and it is an object of the invention to provide a novel and improved device of this general character including a body provided with a single weedless hook attached to the body in an upward position and depending therefrom.

Another object of the invention is to provide a novel and improved fish bait or lure which may be effectively employed for casting or trolling, and which may also be used either as a surface bait or an under water bait.

An additional object of the invention is to provide a novel and improved fish bait or lure which may be successfully employed in very grassy or weedy places, and wherein the bait or lure can be used as a surface bait or an under water bait at the will of the operator.

A still further object of the invention is to provide a novel and improved bait or lure of this general character whereby the hook is normally protected against entanglement with weeds, grass or the like and whereby the hook is effectively protected from twisting or moving laterally or sidewise.

It is also an object of the invention to provide a device of this general character with novel and improved means whereby the hook is securely maintained in a raised position and will not shake out when casting, or even by the strain of back lashes.

The invention consists in the details of construction and in the combination and arrangement of the several parts of my improved fish bait or lure whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation with a portion broken away, of an artificial bait or lure constructed in accordance with my invention;

Fig. 2 is a view in top plan of the device as disclosed in Fig. 1;

Fig. 3 is a view in side elevation of a device with the parts in position when pulling in a fish;

Fig. 4 is an enlarged fragmentary view partly in section and partly in elevation illustrating the means for holding the hook in raised position, and, Fig. 5 is a view in perspective of the plate secured to the under surface of the body.

As disclosed in the accompanying drawings, 1 denotes the body of the bait or lure which is substantially ellipsoidal or ovoidal. The body 1 is provided with a forwardly disposed extension 2, said extension having its upper face substantially flat and extending downwardly and forwardly.

Extending outwardly from the flat face $a$ of the extension 2 is an eye 4, with which interlocks an end portion of a weedless hook H. The weedless hook H is substantially V shape in form with its apex disposed in a direction away from the extension 2, and the apex portion thereof is provided with an eye 5 to which the line is adapted to be connected. The free end portion of one of the arms 6 of the hook H is provided with the eye $4^a$ engaged with the eye 4, while the second arm 7 of the hook H is of a length to partially underlie the extension 2. This weedless hook H is of great importance for the reason that it prevents grass, weeds or the like from catching on the line.

It is also to be noted that the free end portions of the arms 6 and 7 are so spaced one with respect to the other that the hook H will not engage with any part of the extension or tail 2, as said hook swings in a circle around said extension or tail 2 and thereby materially increasing the value of the lure.

The under surface of the body 1 at substantially the transverse center thereof is provided with a longitudinally disposed groove 8 extending from a point slightly inward of the rear end of the body 1 to the junction of the body 1 and the extension or tail 2.

P denotes an elongated and substantially U shape metallic plate having its side arms 10 extending along the longitudinal sides of the groove 8 and partially underlying the same, and the space between the opposed edges of said side arms is slightly greater than the largest diameter of the shank 11 of the fish hook F. The plate P serves to protect the body 1 and also to keep the hook F from turning or twisting sidewise, and the space between the arms 10 of the plate P permits the hook to freely move downward.

The free end portion of the shank 11 of the hook F is provided with an eye 12, which freely interlocks with an eye 14 extending outwardly from the under face of the extension or tail 2 at a point substantially diametrically opposed to the eye 4.

W denotes a second weedless hook or guard comprising an elongated strip of metal having one end portion secured to the free end portion of the shank 11 of the hook F adjacent the eye 12. The rear or free end portion of the hook or guard W is provided with an angular extension 15 disposed toward the body 1 and said hook or guard W is of a length to terminate in close proximity to the hook F. The hook or guard W prevents the hook F from becoming entangled in weeds, grass or the like because the hook or guard W, as it engages such grass or weeds will ride thereover and at the same time lift the body 1 so that the hook F will not be engaged with such grass or weeds.

By having the shank 11 of the hook F secured to the extension or tail 2 at the point hereinbefore set forth, leverage is afforded to facilitate the fisherman raising the body 1 away from the hook F and also at the same time the hook is penetrating the mouth of the fish, the fish pushes up on the body 1 so that both the fisherman and the fish are engaged from releasing the hook from its raised position within the body 1.

The flat upper surface a of the extension or tail 2 is for the purpose of submerging the body 1 and also to increase resistance as the body 1 passes through the water, which causes the lure to wiggle or dart from side to side, and thereby effectively simulate live bait.

M denotes a substantially U shaped member extending within the groove 8 and having the free end portion of an arm 16 thereof secured to the plate P at one side of the groove 8. The free end portion of the second arm 16 of the member M seats within a notch 17 produced in the opposite portion of the plate P and said second arm 16 is provided with a lateral extension or foot 16ª underlying said plate. The base portion of the groove 8 is provided with a recess or pocket 18 in which extends the connected end portion of the member M. The arms 16 immediately adjacent the base of the groove 8 are provided with the outbows 19 in which is arranged the shank 11 of the hook F when said hook is in raised position. The portions of the arm 16 outwardly of or below the outbows 19 are normally spaced apart a distance less than the diameter of the shank 11, or more particularly that portion thereof passing between said arm 16. By this means it will be at once understood that the member M serves to maintain the hook F in raised position but offers no undue obstruction to the release or downward movement of the hook F when the hook F is struck by a fish.

When a fish is caught by the hook F the pull from the line is substantially direct to the hook F, as is occasioned by the connection of the shank 11 with the extension or tail 2 and the connection of the hook or guard H with said extension or tail 2.

It is to be stated at this time that my improved fish bait or lure as herein embodied is an improvement on the fish bait or lure described and claimed in my copending application, Serial No. 260,296, filed October 30, 1918, and that the present bait or lure possesses in the main the advantages in operation which are particularly stated in this prior application.

From the foregoing description, it is thought to be obvious that a fish bait or lure constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. An artificial bait comprising a body, a substantially V shaped member having one end portion loosely engaged with an end portion of the body, the opposite end portion of said member being of a length to partially overlie the body, the apex portion of said member being provided with means to secure a line thereto, and a fish hook having its shank loosely engaged with said body at a point substantially diametrically opposed to the connection between the member and the body.

2. An artificial bait comprising a body having a longitudinally disposed groove in its under face, a fish hook having its shank loosely engaged with the under portion of the body at a point in advance of the groove, said hook being partially insertible within the groove, and yieldable means arranged within the groove for normally holding the hook within the groove.

3. An artificial bait comprising a body having a longitudinally disposed groove in its under portion, a plate extending along opposite sides of said groove and partially underlying the same, and a fish hook having its shank pivotally engaged with the under portion of the body in substantially longitudinal alinement with the groove, said shank being insertible within the groove, the space between the opposed edges of the plate being substantially equal to the diameter of the shank.

4. An artificial bait comprising a body having a longitudinally disposed groove in its under portion, a plate extending along opposite sides of said groove and partially underlying the same, a fish hook having its shank pivotally engaged with the under portion of the body in substantially longitudinal alinement with the groove, said shank being insertible within the groove, the space between the opposed edges of the plate being substantially equal to the diameter of the shank, and a substantially U shape member extending within the groove, a free end portion of said member being secured to the plate at one side of the groove, the arms of said member frictionally engaging the shank of the hook to yieldingly hold said shank within the groove.

5. An artificial bait comprising a body having a longitudinally disposed groove in its under portion, a plate extending along opposite sides of said groove and partially underlying the same, a fish hook having its shank pivotally engaged with the under portion of the body in substantially longitudinal alinement with the groove, said shank being insertible within the groove, the space between the opposed edges of the plate being substantially equal to the diameter of the shank, and a substantially U shape member extending within the groove, a free end portion of said member being secured to the plate at one side of the groove, the arms of said member frictionally engaging the shank of the hook to yieldingly hold said shank within the groove, the plate at the opposite side of the groove being provided with a notch in which extends the opposite end portion of the member.

6. An artificial bait comprising a body having a longitudinally disposed groove in its under portion, a plate extending along opposite sides of said groove and partially underlying the same, a fish hook having its shank pivotally engaged with the under portion of the body in substantially longitudinal alinement with the groove, said shank being insertible within the groove, the space between the opposed edges of the plate being substantially equal to the diameter of the shank, and a substantially U shaped extending within the groove, a free end portion of said member being secured to the plate at one side of the groove, the arms of said member frictionally engaging the shank of the hook to yieldingly hold said shank within the groove, the plate at the opposite side of the groove being provided with a notch in which extends the opposite end portion of the member, said opposite end portion of the member being provided with a lateral extension disposed in a direction away from the groove.

In testimony whereof I hereunto affix my signature.

SAMUEL J. BROWN.